United States Patent
Nozue

(10) Patent No.: US 8,273,502 B2
(45) Date of Patent: Sep. 25, 2012

(54) DIRECT METHANOL FUEL CELL SYSTEM USING SOLID METHANOL, PORTABLE ELECTRONIC DEVICE USING SAME, AND FUEL CARTRIDGE FOR DIRECT METHANOL FUEL CELL SYSTEM

(75) Inventor: Mitsuru Nozue, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 383 days.

(21) Appl. No.: 12/450,400

(22) PCT Filed: Mar. 25, 2008

(86) PCT No.: PCT/JP2008/055503
§ 371 (c)(1),
(2), (4) Date: Dec. 3, 2009

(87) PCT Pub. No.: WO2008/123218
PCT Pub. Date: Oct. 16, 2008

(65) Prior Publication Data
US 2010/0092827 A1    Apr. 15, 2010

(30) Foreign Application Priority Data

Mar. 29, 2007 (JP) ................... 2007-089151
Oct. 23, 2007 (JP) ................... 2007-275734

(51) Int. Cl.
*H01M 8/04* (2006.01)
(52) U.S. Cl. ........ 429/515; 429/502; 429/506; 429/479; 429/443

(58) Field of Classification Search .................. 429/506, 429/502, 512, 515, 516, 479, 482, 491, 443
See application file for complete search history.

(56) References Cited

U.S. PATENT DOCUMENTS
2010/0098995 A1 * 4/2010 Obuse et al. .................... 429/33

FOREIGN PATENT DOCUMENTS
JP         02-234358    *  9/1990
(Continued)

OTHER PUBLICATIONS
International Search Report of the International Searching Authority mailed on Jun. 24, 2008 for the corresponding international patent application No. PCT/JP2008/055503 (English translation enclosed).

*Primary Examiner* — Raymond Alejandro
(74) *Attorney, Agent, or Firm* — Posz Law Group, PLC

(57) ABSTRACT

A fuel cartridge has a pair of flat faces in which holes are formed. A net is stretched within the holes, and solid methanol is packed inside the fuel cartridge. A fuel cell unit, shaped as a flat box, comprises a pair of flat wall portions, a pair of long-side wall portions, and a pair of short-side wall portions. Each flat wall portion is provided with two MEAs-4, as fuel cells that are arranged so that the fuel electrodes (not shown) face inward. One of the long-side wall portions has an opening provided with, on the edge thereof, an elastic packing serving as a sealing member. An opening and closing lid is pivotably provided to the opening by a pivot as a pivot member. The resulting reduced size methanol fuel cell system has sufficient air-tightness and good power generation efficiency, and is simple in structure.

20 Claims, 9 Drawing Sheets

FOREIGN PATENT DOCUMENTS

| | | |
|---|---|---|
| JP | H02-234358 A | 9/1990 |
| JP | H04-014765 A | 1/1992 |
| JP | 2005-325254 A | 11/2005 |
| JP | 2006-040629 A | 2/2006 |
| JP | 2006-318684 A | 11/2006 |
| JP | 2006-331751 A | 12/2006 |
| WO | WO 2005/062410 | 7/2005 |

* cited by examiner

DIRECT METHANOL FUEL CELL SYSTEM USING SOLID METHANOL, PORTABLE ELECTRONIC DEVICE USING SAME, AND FUEL CARTRIDGE FOR DIRECT METHANOL FUEL CELL SYSTEM

CROSS REFERENCE TO RELATED APPLICATIONS

This application is a U.S. national stage application of PCT/JP2008/055503 filed on Mar. 25, 2008, and claims priority to, and incorporates by reference, Japanese Patent Applications No. 2007-089151 filed on Mar. 29, 2007 and No. 2007-275734 filed on Oct. 23, 2007.

TECHNICAL FIELD

The present invention relates to a methanol fuel cell system using solid methanol as a fuel. The invention also relates to a portable electronic device using the fuel cell system. Further, the invention relates to a fuel cartridge for a direct methanol fuel cell system using solid methanol as a fuel.

BACKGROUND ART

Polymer electrolyte fuel cells are devices in which a fuel electrode and an oxidant electrode are respectively bonded to both faces of a solid electrolyte membrane such as a membrane of perfluorosulfonic acid or the like, as the electrolyte, and wherein power is generated through an electrochemical reaction sustained by supplying hydrogen or methanol to the anode, and oxygen to the cathode. Among such fuel cells, polymer electrolyte fuel cells using methanol as fuel, called "direct methanol fuel cells (DMFCs)", generate power in accordance with the following reactions.

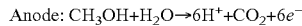  [1]

Anode: $CH_3OH + H_2O \rightarrow 6H^+ + CO_2 + 6e^-$  [1]

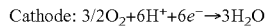  [2]

Cathode: $3/2 O_2 + 6H^+ + 6e^- \rightarrow 3H_2O$  [2]

To support these reactions, the electrodes are made of a mixture of a solid polymer electrolyte with carbon microparticles that carry a catalytic substance.

In such direct methanol fuel cells, the methanol supplied to the anode passes through pores in the electrode and reaches the catalyst. The catalyst causes the methanol to decompose and generate electrons and hydrogen ions, in accordance with reaction [1] above. The hydrogen ions traverse the electrolyte of the anode and the solid electrolyte membrane interposed between the two electrodes, and reach the cathode, where they react with oxygen supplied to the cathode and with electrons flowing through an external circuit, to generate water in accordance with reaction [2] above. The electrons released by the methanol traverse the catalyst carrier in the anode and are led to an external circuit through which they flow into the cathode. As a result, power is extracted at the external circuit on account of the flow of electrons from the anode to the cathode.

Direct methanol fuel cells using methanol as fuel are useful as small power sources for portable electronic devices, because of their low operating temperature and the fact that they require no major auxiliary equipment, among other advantages. Efforts to develop direct methanol fuel cells as next-generation power sources for portable computers, cell phones and the like have intensified in recent years.

The methanol used as fuel, however, is a liquid, and hence prone to leaking. The flammability and toxicity of methanol itself are also grounds for concern. Coming up with ways of using methanol safely has thus become a challenge. Further demerits of using a liquid fuel include, for instance, impairment of fuel cell performance when impurities dissolved in the liquid fuel are supplied to the fuel cell, and the phenomenon of crossover, whereby methanol, as the liquid fuel component, permeates through the electrolyte membrane of the fuel cell and gets to the air electrode. In particular, crossover results not only in a drop of power generation efficiency per unit volume of fuel, but also in the formation of hazardous substances such as formaldehyde, formic acid and methyl formate in the oxidation process at the air electrode. Solving these problems has become a significant issue in the practical application of DMFCs.

The mainstream approach to increasing fuel volume density in DMFC systems developed in recent years involves using methanol at higher concentrations. However, higher fuel concentrations further exacerbate the problem of crossover. Another approach for reducing crossover relies on improving the materials of the electrolyte membranes and so forth that are used in the cells, although this approach has not been fully successful thus far. This failure has significantly hindered the commercialization of DMFCs.

To address the issue of methanol safety, among others, the present applicant has proposed therefore various "solid methanol fuels" in which methanol is made into a solid state, through formation of a molecular compound, to reduce the likelihood of fuel leaking while substantially reducing the flammability of the fuel (Patent documents 1 to 3). When the solid methanol comes into contact with water, the methanol in the solid is released into the water. The resulting methanol aqueous solution can also be used as the fuel of a direct methanol fuel cell.

Patent document 1: Japanese Patent Application Laid-open No. 2006-040629
Patent document 2: Japanese Patent Application Laid-open No. 2005-325254
Patent document 3: WO 2005/062410

DISCLOSURE OF THE INVENTION

Problem to be Solved by the Invention

Conceivable ways of extracting fuel methanol out of solid methanol include feeding water to solid methanol, to release thereby a methanol solution as the fuel (water-feed type), or vaporizing methanol out of solid methanol (vaporization type).

Among these methanol extraction methods, vaporization is advantageous in that it requires no water supply mechanism such as a water tank and a water pump, and hence makes for a simpler device structure. Vaporization allows also the amount of methanol discharged to be controlled easily.

The applicant has proposed various DMFC systems in which this vaporization approach is further developed. In such DMFC systems, power is generated directly by methanol vaporized from solid methanol, by planarly arranging a fuel cell such that the fuel cell faces towards the vicinity of an opening face of a fuel cartridge packed with solid methanol (for instance, Japanese Patent Application Nos. 2006-278162, 2006-278163, 2006-278164 and 2006-278165).

In these fuel cell systems, one fuel cell was planarly disposed in the vicinity of an opening area of a fuel cartridge. As a result, there could only be arranged as many fuel cells as there were opening areas in the fuel cartridge, and hence it was not possible to sufficiently increase the surface area of the fuel cell per unit volume of the fuel cartridge. This can conceivably be countered by enlarging the opening areas of the fuel cartridge, but ensuring air-tightness over the opening areas is difficult, and thus larger opening areas may impair vaporized methanol sealability. The above DMFC systems left thus room for improvement as regards efficiency.

The fuel cartridges used in such fuel cell systems were also problematic in that they had to be stored in a sealed bag or the like up to immediately before use, to prevent release of fuel. Once the fuel cartridge was set in the fuel cell system, however, fuel release was difficult to control.

It would therefore be desirable to provide a fuel cell system having a simple and small structure, which could then contribute significantly to a wider adoption of DMFCs.

In the light of the above problems, it is an object of the present invention to provide a methanol fuel cell system that has sufficient air-tightness and good power generation efficiency per unit volume, and that can be reduced in size with simple structure. It is a further object of the present invention to provide a portable electronic device comprising such a methanol fuel cell system. It is yet another object of the present invention to provide a fuel cartridge for direct methanol fuel cell systems using solid methanol as a fuel.

Means for Solving the Problem

To solve the above problems, the present invention provides firstly a direct methanol fuel cell system, comprising a hollow flat plate-like fuel cartridge in which solid methanol is stored; and fuel cells disposed on the side of a flat face of the fuel cartridge (Invention 1).

In the above invention (Invention 1), the fuel cells are disposed facing a hollow flat plate-like fuel cartridge, and hence it is possible to provide a plurality of fuel cells for one fuel cartridge, and to generate power efficiently relative to the volume of the fuel cartridge.

In the above invention (Invention 1), preferably, the fuel cells are disposed with fuel electrodes facing inward so as to constitute a pair of flat wall portions of a flat box-like fuel cell unit capable of housing the fuel cartridge (Invention 2).

In the above invention (Invention 2), power can be generated and sufficient air-tightness from the exterior can be secured by simply storing the fuel cartridge in the fuel cell unit. Also, the fuel cartridge can be replaced by simply removing the fuel cartridge from the fuel cell unit.

In the above invention (Invention 2), preferably, a plurality of the fuel cells is disposed at the flat wall portions of the fuel cell unit (Invention 3).

In the above invention (Invention 3), there can be provided at least four fuel cells per fuel cartridge. Therefore, it is possible to generate power more efficiently relative to the volume of the fuel cartridge.

In the above inventions (Inventions 2 and 3), the flat box-like fuel cell unit has an opening on a side face, such that the fuel cartridge can be inserted and removed through the opening (Invention 4).

In the above invention (Invention 4), power can be generated and sufficient air-tightness from the exterior can be secured by simply storing the fuel cartridge in the fuel cell unit through a side face thereof. Also, the fuel cartridge can be replaced by simply removing the fuel cartridge from the fuel cell unit through a side face thereof.

In the above inventions (Inventions 2 and 3), one flat wall portion of the flat box-like fuel cell unit is openably and closably mounted on a side wall portion of the fuel cell unit, and the fuel cartridge can be inserted and removed from the side of the one flat wall portion (Invention 5).

In the above invention (Invention 5), it is possible to generate power by simply opening one flat wall portion of the fuel cell unit, storing the fuel cartridge, and then closing the one flat wall portion. It is also possible to secure sufficient air-tightness from the exterior, and to generate power, by opening a flat wall portion of one side of the fuel cell unit, and removing then the fuel cartridge.

In the above inventions (Inventions 2 to 5), the fuel cartridge comprises a cartridge main body and opening-closing valves, the cartridge main body comprises a pair of flat plate sections and a peripheral side section, and the opening-closing valves are provided facing at least one of the flat plate sections (Invention 6). Preferably, in particular, opening and closing members corresponding to the opening-closing valves are provided in the flat wall portion of the fuel cell unit (Invention 7).

In the above inventions (Invention 6 and 7), leakage of fuel from the fuel cartridge can be prevented by maintaining a state in which the fuel cartridge is closed by the opening-closing valves, before storing the fuel cartridge in the fuel cell unit. When the fuel cartridge is stored in the fuel cell unit, power can be generated by the fuel released from the fuel cartridge through opening of the opening-closing valves. When the fuel cartridge is removed from the fuel cell unit, power generation can be discontinued, while preventing waste of fuel, by maintaining a state in which the fuel cartridge is closed again by the opening-closing valves.

Secondly, the present invention provides a fuel cartridge for the direct methanol fuel cell system according to the above inventions (Invention 1 to 7), wherein the fuel cartridge comprises a cartridge main body and opening-closing valves, the cartridge main body comprises a pair of flat plate sections and a peripheral side section, and the opening-closing valves are provided facing at least one of the flat plate sections (Invention 8).

In the above invention (Invention 8), leakage of fuel from the fuel cartridge can be prevented by maintaining a state in which the fuel cartridge is closed by the opening-closing valves, before storing the fuel cartridge in the fuel cell unit. When the fuel cartridge is stored in the fuel cell unit, power can be generated by the fuel released from the fuel cartridge through opening of the opening-closing valves. When the fuel cartridge is removed from the fuel cell unit, power generation can be discontinued, while preventing waste of fuel, by maintaining a state in which the fuel cartridge is closed again by the opening-closing valves.

Thirdly, the present invention further provides a portable electronic device (Invention 9) comprising a direct methanol fuel cell system according to the above inventions (Inventions 1 to 7).

The above invention (Invention 9) allows providing a portable electronic device that uses, as a power source, a methanol fuel cell system having sufficient air-tightness and good power generation efficiency per unit volume.

Advantageous Effect of the Invention

The fuel cell system of the present invention allows providing plural fuel cells facing a hollow flat plate-like fuel cartridge. Therefore, the invention allows efficiently using methanol vaporized from solid methanol, thereby affording good power generation efficiency per unit volume. Vaporized methanol, as a fuel, can be supplied by arranging the fuel cells in such a manner so as to constitute a pair of flat wall portions of the flat box-like fuel cell unit capable of housing the fuel cartridge, and by storing the fuel cartridge in such a fuel cell unit. This allows securing sufficient air-tightness as a result.

Also, waste of fuel can be prevented during storage and during stand-by, by providing the opening-closing valves in the fuel cartridge.

DESCRIPTION OF THE REFERENCE NUMERALS

| | |
|---|---|
| 1, 11, 21 | fuel cartridge |
| 1A, 11A, 21A | flat face |
| 2, 12, 22 | fuel cell unit |
| 2A, 12A, 22A | flat wall portion |
| 12B, 22B | long-side wall portion (side wall portion) |
| 4, 14, 31 | MEA (fuel cell) |
| 5, 15, 32 | opening |
| 23 | holes |
| 24 | opening-closing valve |
| 34 | opening rod (opening and closing member) |

BEST MODE FOR CARRYING OUT THE INVENTION

Embodiments of the present invention are explained below with reference to accompanying drawings.

Figure 1:
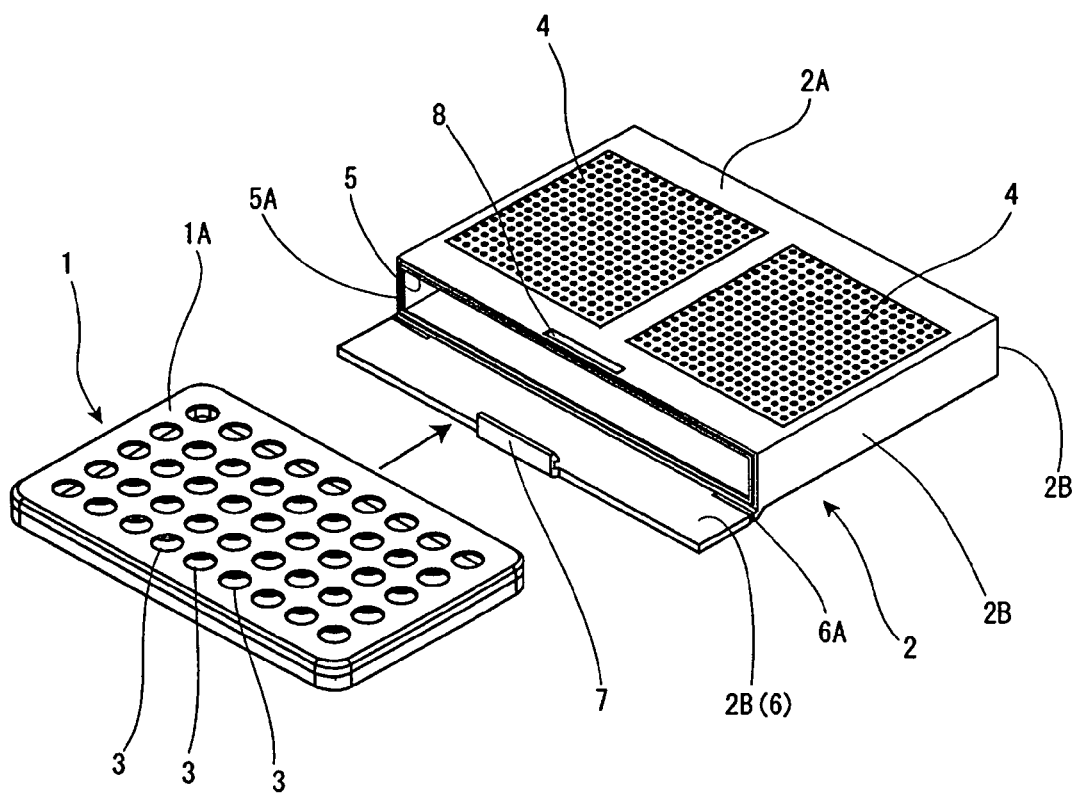
FIG. 1 is a perspective-view diagram illustrating a methanol fuel cell system according to a first embodiment of the present invention.

FIG. 1 is a perspective-view diagram illustrating a fuel cell system according to a first embodiment of the present invention.

In FIG. 1, the reference numeral 1 denotes a fuel cartridge, and the reference numeral 2 denotes a fuel cell unit. The fuel cartridge 1 has a plurality of holes 3 formed in a pair of flat faces 1A. The flat faces 1A have a double-plate structure, such that the inward plate (not shown in the figure) constitutes a slidable shutter. This shutter is constructed in such a manner that the holes 3 are normally closed by way of an elastic member or the like, and in such a manner that the holes 3 are opened when a below-described opening and closing lid 6 is closed. The interior of the fuel cartridge 1 is packed with solid methanol, which is prevented from spilling by means of a net spread over the holes 3. For convenience, the net and the solid methanol have been omitted in the drawings.

The fuel cell unit 2, which is shaped as a flat box, comprises a pair of flat wall portions 2A, a pair of long-side wall portions 2B, and a pair of short-side wall portions 2C. Each flat wall portion 2A of the pair thereof is provided with two MEAs 4, as fuel cells, to a total four MEAs 4 arranged in such a manner that the fuel electrodes (not shown) face inward. One of the long-side wall portions 2B has an opening 5 provided with, on the edge thereof, an elastic packing 5A serving as a sealing member. An opening and closing lid 6 is pivotably provided to the opening 5 by a pivot 6A as a pivot member. The reference numeral 7 denotes a stopper of the opening and closing lid 6, and the reference numeral 8 denotes a stopper receiving portion formed in the flat wall portion 2A. The MEAs 4 comprise each an integrated stack of a fuel electrode, an air electrode and an electrolyte membrane provided therebetween. The MEAs 4 can supply power through connection of the fuel electrode and the air electrode to a circuit not shown.

The operation of the methanol fuel cell system of the present embodiment having the above configuration is explained next.

The holes 3 of the fuel cartridge 1 are normally closed by the shutter. Then, with the opening and closing lid 6 of the fuel cell unit 2 in an open state, the fuel cartridge 1 is stored into the fuel cell unit 2 via the opening 5, the opening and closing lid 6 is closed, and the stopper 7 is locked onto the stopper receiving portion 8. Thereupon, the interior or fuel cell unit 2 becomes sealed by the elastic packing 5A provided at the edge of the opening 5, at the same time that the shutter slides to open the holes 3.

As a result, gaseous methanol directly generated from solid methanol in the fuel cartridge 1 is supplied to the fuel electrodes of the MEAs 4, whereupon there is generated power that can be supplied to a circuit.

In the present embodiment, two MEAs 4 are provided at each flat wall portion in a pair thereof, i.e. a total of four MEAs 4 are provided in the fuel cell unit 2. Thus, four MEAs 4 are provided for one fuel cartridge 1. As a result, power can be generated efficiently relative to the volume of solid methanol packed in the fuel cartridge 1, while preserving at the same time air-tightness of methanol vaporized out of the fuel cartridge 1 towards the outer environment.

To discontinue power generation, the holes 3 may be closed through sliding of the shutter, by releasing the stopper 7 off the stopper receiving portion 8 and by opening the opening and closing lid 6. Also, the fuel cartridge 1 can be replaced simply by removing the fuel cartridge 1 through the opening 5 on the side face of the fuel cell unit 2.

The fuel cell system of the present embodiment has sufficient air-tightness and good power generation efficiency per unit volume, and is thus suitable for portable electronic devices.

As the solid methanol in the present embodiment there can be used, for instance, a molecular compound of methanol, solid methanol obtained through solidification of methanol together with a polymer or through gelling of methanol, or solid methanol in which methanol is held in a solid state through adsorption or the like onto an inorganic material such as magnesium aluminometasilicate. Particularly preferred is solid methanol in which methanol is held in a solid state through adsorption or the like onto an inorganic material such as magnesium aluminometasilicate, since in such a form the gasification amount of methanol exhibits a significant temperature dependence that varies little over time. Accordingly, the generation amount of gasified methanol can be adjusted to some extent through temperature control by a heating means. This affords as a result excellent controllability of the concentration of a methanol solution.

The molecular compound is a compound formed through bonding of two or more individually stable compounds by way of relatively weak interactions other than covalent bonds, typically hydrogen bonds, Van der Waal's forces or the like. The molecular compound may be a hydrate, solvate, addition compound, inclusion compound or the like. Such molecular compounds can be formed by way of a contact reaction of the fuel for fuel cells with a compound that forms the molecular compound. The fuel for fuel cells can be made thereby into a solid-state compound, so that the fuel for fuel cells can be stored stably and with a comparatively low weight.

Examples of molecular compounds include, for instance, methanol inclusion compounds resulting from a contact reaction between methanol and a host compound.

Also, solid methanol obtained through solidification of methanol together with a polymer or through gelling of methanol with dibenzylidene-D-sorbitol or the like can have a coating applied to the surface, to allow controlling the vaporization temperature of methanol.

The solid methanol can be used in various forms. Preferred forms include, for instance, microparticles, particles, sheets and the like.

Figure 2:
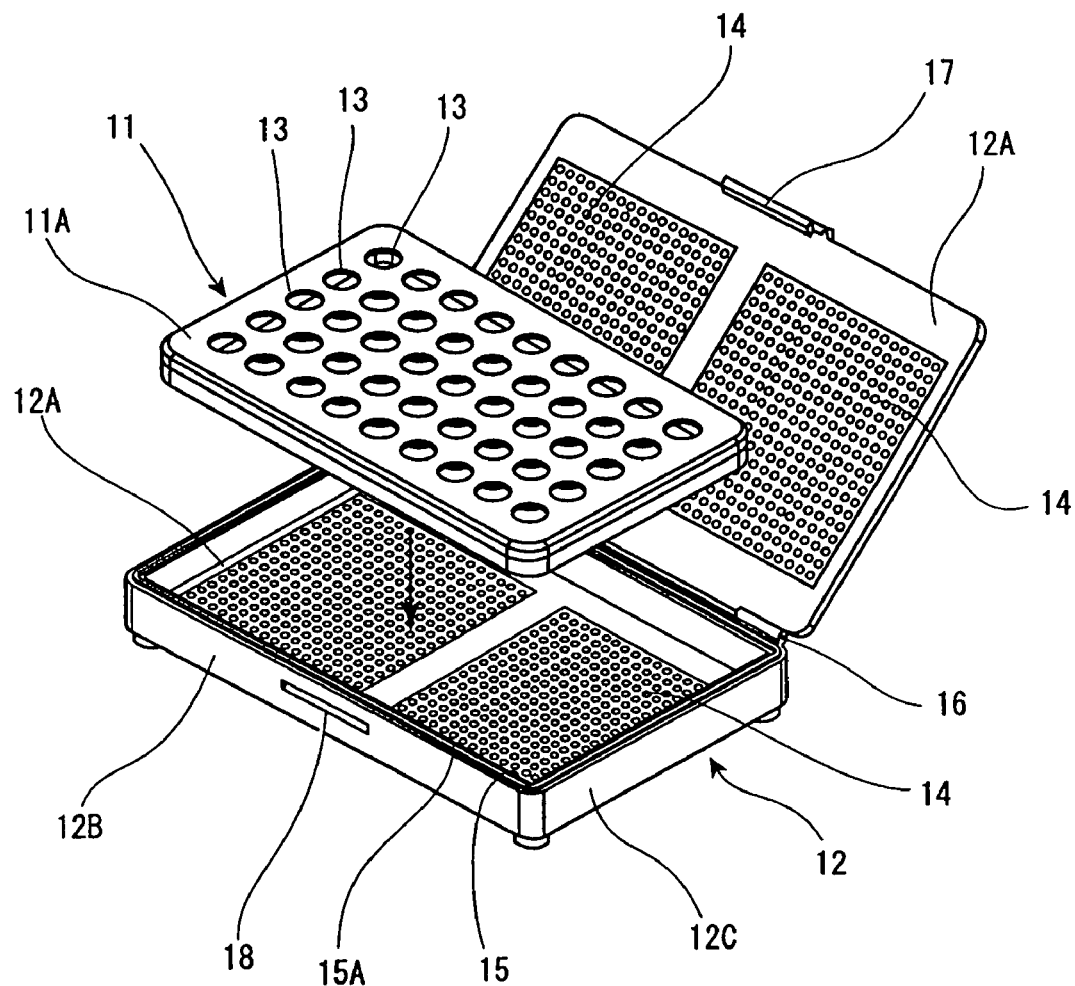
FIG. 2 is a perspective-view diagram illustrating a methanol fuel cell system according to a second embodiment of the present invention.

A fuel cell system according to a second embodiment of the present invention will be explained next with reference to FIG. 2. FIG. 2 is a perspective-view diagram illustrating a fuel cell system according to a second embodiment of the present invention.

In FIG. 2, the reference numeral 11 denotes a fuel cartridge, and the reference numeral 12 denotes a fuel cell unit. The fuel cartridge 11 has a plurality of holes 13 formed in a pair of flat faces 11A. The flat faces 11A have a double-plate structure, such that the inward plate (not shown in the figure) is a slidable shutter. This shutter is constructed in such a manner that the holes 13 are normally closed by way of an elastic member or the like, and in such a manner that the holes 13 are opened when a below-described flat wall portion 12A is closed. The interior of the fuel cartridge 11 is packed with solid methanol, which is prevented from spilling by means of a net spread over the holes 13. For convenience, the net and the solid methanol have been omitted in the drawings.

The fuel cell unit 12, which is shaped as a flat box, comprises a pair of flat wall portions 12A, a pair of long-side wall portions 12B, and a pair of short-side wall portions 12C. Each flat wall portion 12A of the pair thereof is provided with two MEAs 14, as fuel cells, to a total four MEAs 14 arranged in such a manner that the fuel electrodes (not shown) face inward. One of the flat wall portions 12A of the fuel cell unit 12 is a separate member that is pivotably provided, by way of a pivot 16 as a pivot member, on one of the long-side wall portions 12B in such a manner so as to open and close an opening 15 whose edge is provided with an elastic packing 15A as a sealing member. The reference numeral 17 denotes a stopper of the flat wall portion 12A, and the reference numeral 18 denotes a stopper receiving portion formed on the other long-side wall portion 12B.

The operation of the methanol fuel cell system of the present embodiment having the above configuration is explained next.

Initially, the holes 13 of the fuel cartridge 11 are normally closed by the shutter. The fuel cartridge 11 is stored into the fuel cell unit 12, via the opening 15, with one of the flat wall portions 12A of the fuel cell unit 12 in an open state. The flat wall portion 12A is pivoted about the pivot 16, to close the opening 15. The stopper 17 is locked next onto the stopper receiving portion 18. Thereupon, the interior of fuel cell unit 12 becomes sealed by the elastic packing 15A provided at the edge of the opening 15, at the same time that the shutter slides to open the holes 13.

Gaseous methanol directly generated from solid methanol in the fuel cartridge 11 is supplied to the fuel electrodes of the MEAs 14, whereupon there is generated power that can be supplied to a circuit.

In the present embodiment two MEAs 14 are provided at each flat wall portion in a pair thereof, i.e. a total of four MEAs 14 are provided in the fuel cell unit 12. Thus, four MEAs 14 are provided for one fuel cartridge 11. As a result, power can be generated efficiently relative to the volume of solid methanol packed in the fuel cartridge 11, while preserving at the same time air-tightness of methanol vaporized out of the fuel cartridge 11 towards the outer environment.

The same solid methanol forms as in the first embodiment can be used as the solid methanol in the present embodiment described above.

A third embodiment of the present invention will be explained next with reference to FIGS. 3 to 6.

In FIGS. 3 to 6, the reference numeral 21 denotes a fuel cartridge, and the reference numeral 22 denotes a fuel cell unit. The fuel cartridge 21 is shaped as a substantially rectangular flat box comprising a pair of flat faces 21A, which constitute a flat plate portion, and a side wall face 21B that constitutes a peripheral side portion. A plurality of holes 23, 23 . . . , as release portions, is formed in the pair of flat faces 21A. Opening-closing valves 24, 24 . . . are provided facing the holes 23, 23 . . . . The opening-closing valves 24, 24 . . . are aligned at positions that correspond to the holes 23, 23 . . . by way of positioning rods 25, 25 . . . that are standlingly provided on the inward side of one of the flat faces 21A.

Preferably, the holes 23, 23 . . . are substantially circular. The holes 23, 23 . . . may be formed in both faces of the pair of flat faces 21A, or only in one face, but in the present embodiment the holes 23, 23 . . . are formed in both faces. Forming the holes 23, 23 in both faces yields a fuel release amount of 1.5 to 2.0 times, in particular about 1.8 times the amount released when the holes 23, 23 are provided in only one face. Also, a greater number of holes 23, 23 allows increasing the amount of fuel released, but causes the effective content of solid methanol in a given cartridge to drop, on account of the opening-closing valves 24 provided at the holes 23, 23. Preferably, therefore, the number of holes is designed in such a manner that there are about two opening-closing valves 24 per about 10 cc of solid methanol content. From the viewpoint of safety and release efficiency, the diameter of the above-described holes 23, 23 . . . ranges preferably from 5 to 8.6 mm $\phi$, and is, in particular, of about 8 mm $\phi$.

The opening-closing valves 24, 24 . . . comprise each a first valve body 26A having a convex portion 28 and a closing portion 27 whose diameter is larger than that of a hole 23, and a second valve body 26B having a concave portion 30 and a closing portion 29 whose diameter is larger than that of a hole 23, the convex portion 28 and the concave portion 30 facing each other across an interposed elastic coil spring S, as an elastic member, in such a manner that the closing portion 27 and the closing portion 29 press normally against the holes 23, closing the latter. The interior of the fuel cartridge 21 is packed with solid methanol, but the opening-closing valves 24, 24 . . . provided in the holes 23, 23 . . . prevent the solid methanol from falling off. The reference numerals 27A and 29A denote packings, mounted on the closing portions 27, 29, for sealing the holes 23.

The fuel cell unit 22, which is shaped as a flat box, comprises a pair of flat wall portions 22A, a pair of long-side wall portions 22B, and a pair of short-side wall portions 22C. Each flat wall portion 22A of the pair thereof is provided with two MEAs 31, 31, as fuel cells, to a total four MEAs 31, 31 arranged in such a manner that the fuel electrodes (not shown) face inward. In this fuel cell unit 22, one of the flat wall portions 22A is a separate member that is pivotably provided, by way of a pivot 33 as a pivot member, on one of the long-side wall portions 22B in such a manner so as to open and close an opening 32 whose edge is provided with an elastic packing 32A as a sealing member. Opening rods 34, 34 . . . , as opening and closing members corresponding to the holes 23, 23 . . . , are provided upright on the inner faces of the pair of flat wall portions 22A of the fuel cell unit 22. The reference numeral 35 denotes a stopper of one of the flat wall portions 22A, and the reference numeral 36 denotes a stopper receiving portion formed on the other long-side wall portion 22B.

The operation of the methanol fuel cell system of the present embodiment having the above configuration will be explained next.

Figure 5:
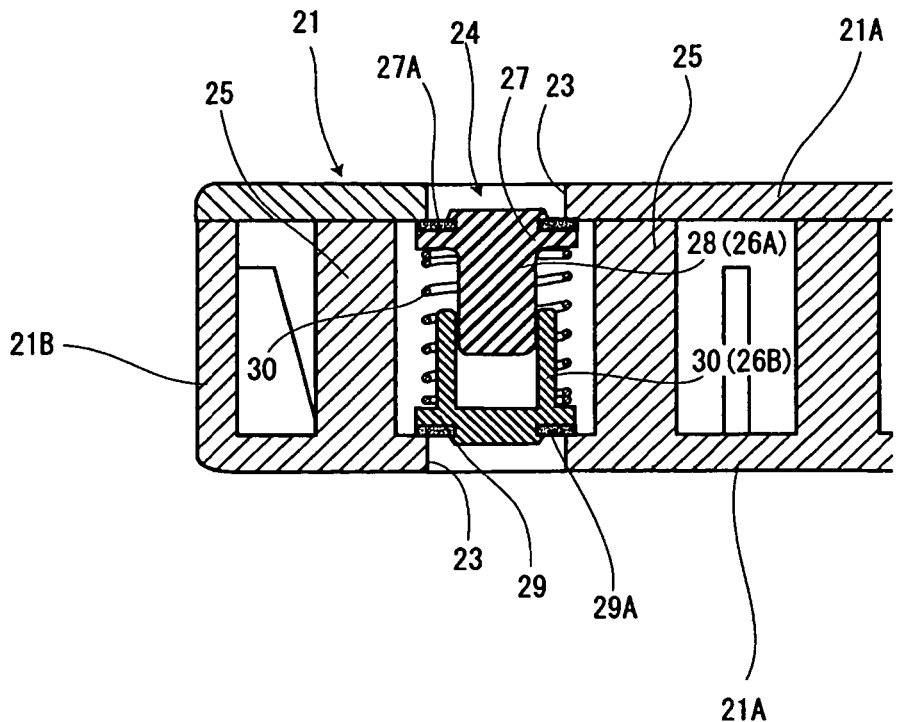
FIG. 5 is a cross-sectional diagram illustrating a fuel cartridge of the methanol fuel cell system according to the above third embodiment, with the fuel cartridge closed.

Firstly, during storage of the fuel cartridge 21, the spring force of the elastic coil spring S causes the holes 23, 23 . . . to be closed by the packing 27A of the closing portion 27 of the first valve body 26A, and by the packing 29A of the closing portion 29 of the second valve body 26B, as illustrated in FIG. 5. As a result, fuel is prevented from leaking from the solid methanol.

The fuel cartridge 21 is stored into the fuel cell unit 22 via the opening 32, with one of the flat wall portions 22A of the fuel cell unit 22 in an open state. The flat wall portion 22A is pivoted about the pivot 33, to close the opening 32. The stopper 33 is locked next onto the stopper receiving portion 36. Thereupon, the interior of fuel cell unit 22 becomes sealed by the elastic packing 32A provided at the edge of the opening 32.

Figure 6:
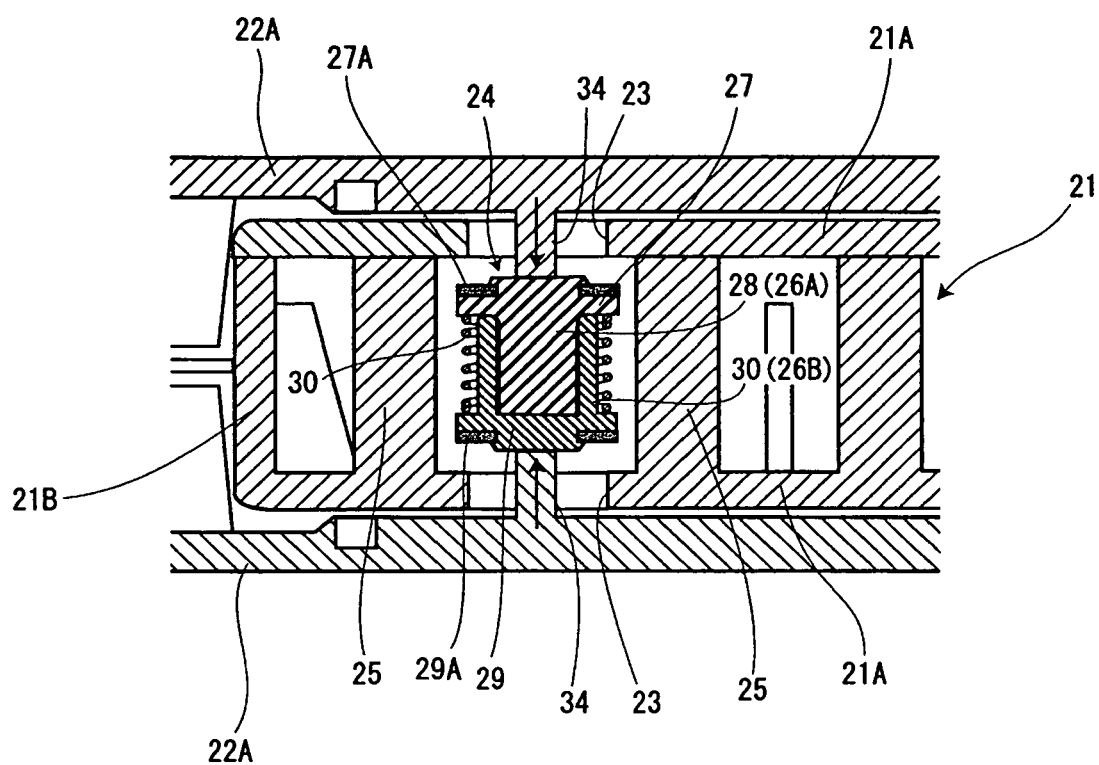
FIG. 6 is a cross-sectional diagram illustrating a fuel cartridge of the methanol fuel cell system according to the above third embodiment, with the fuel cartridge open.

Herein, as illustrated in FIG. 6, the opening rods 34, 34 . . . pass through the holes 23, 23 . . . , and press the first valve body 26A and the second valve body 26B, against the spring force of the elastic coil spring S. The holes 23, 23 . . . become open thereby, with the convex portion 28 of the first valve body 26A stationarily fitting into the concave portion 30 of the second valve body 26B. As a result, gaseous methanol directly generated from solid methanol in the fuel cartridge 21 is supplied to the fuel electrodes of the MEAs 31, 31, whereupon there is generated power that can be supplied to a circuit.

To discontinue power generation, the fuel cell unit 22 may be reverted to the state of FIG. 5, by re-opening one of flat wall portions 22A, which causes the opening rods 34, 34 to withdraw. That is, the holes 23, 23 . . . may be closed by the packing 27A of the closing portion 27 of the first valve body 26A, and the packing 29A of the closing portion 29 of the second valve body 26B, on account of the spring force of the elastic coil spring S. The same solid methanol forms as in the first embodiment can be used as the solid methanol in the present embodiment described above.

Figure 7:
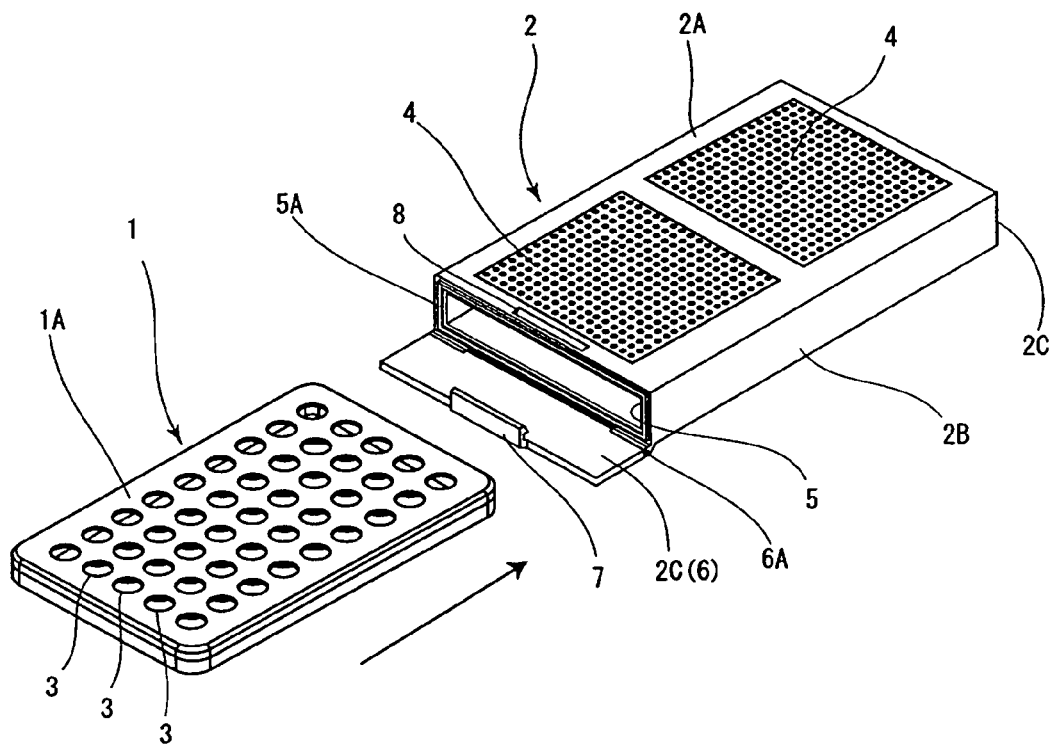
FIG. 7 is a perspective-view diagram illustrating a methanol fuel cell system according to a fourth embodiment of the present invention.
Figure 8:
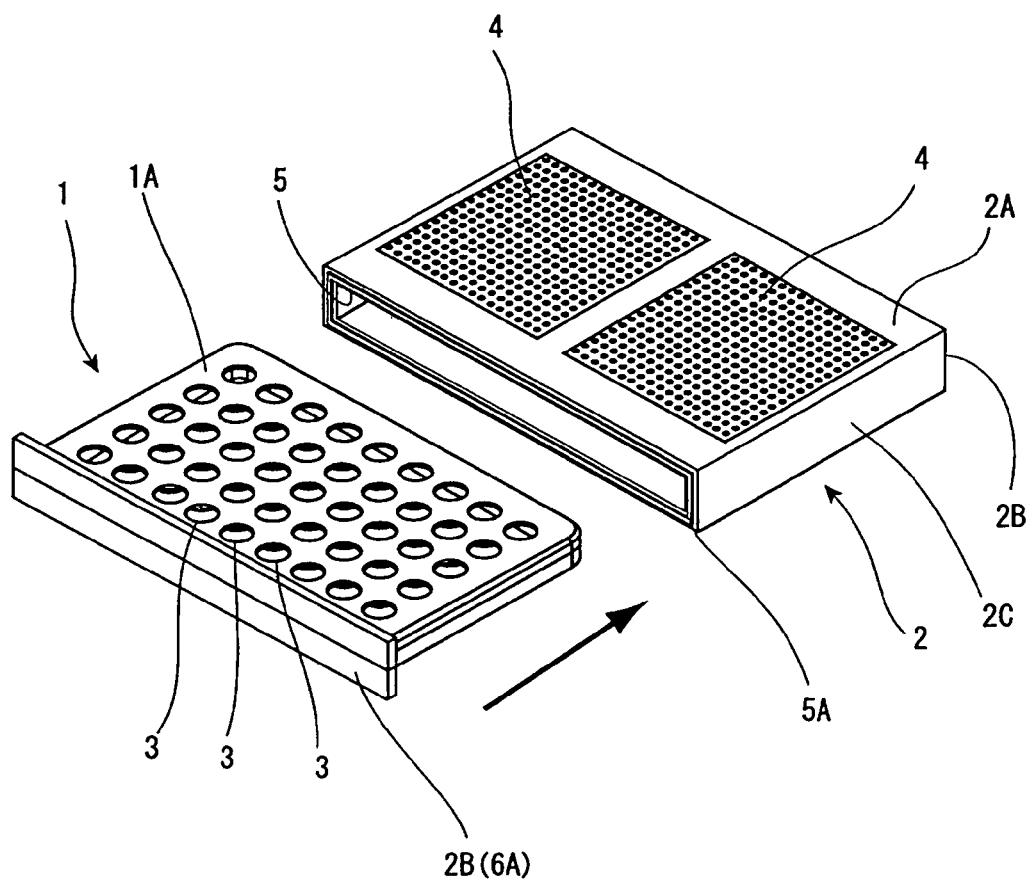
FIG. 8 is a perspective-view diagram illustrating a methanol fuel cell system according to a fifth embodiment of the present invention.
Figure 9:
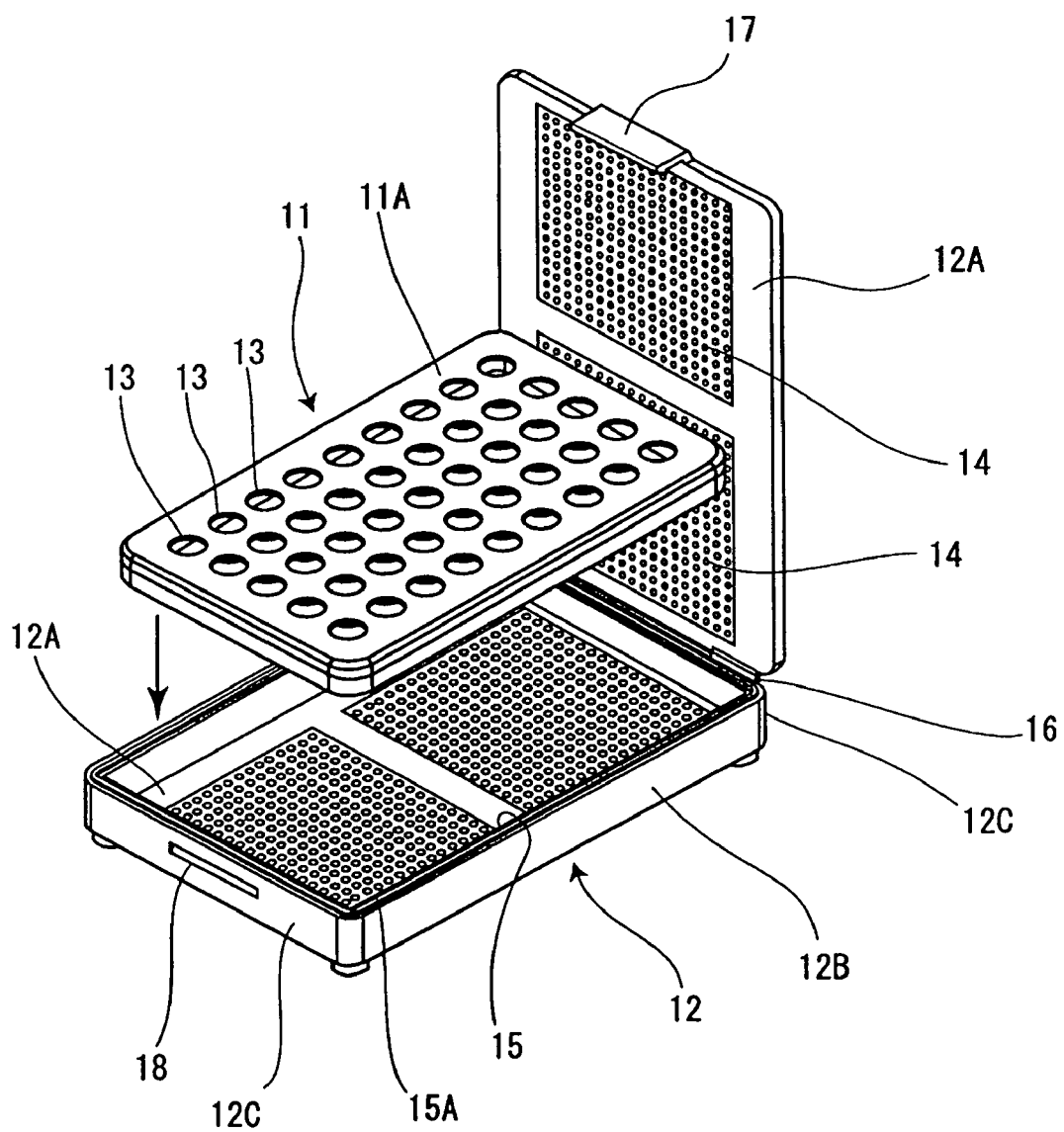
FIG. 9 is a perspective-view diagram illustrating a methanol fuel cell system according to a sixth embodiment of the present invention.
Figure 10:
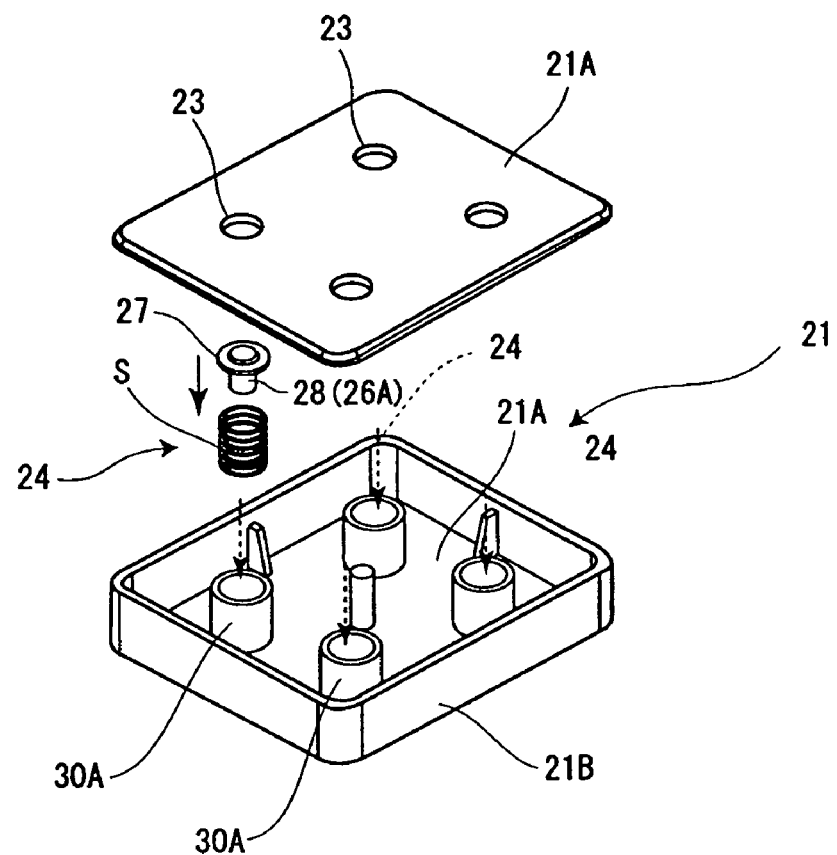
FIG. 10 is an exploded perspective-view diagram illustrating a methanol fuel cell system according to a seventh embodiment of the present invention.

The present invention has been explained on the basis of embodiments. The invention, however, is not limited to these embodiments, and may be modified in numerous ways. For instance, the configuration of the first embodiment may be modified to a longitudinal structure in which the opening 5 provided with the elastic packing 5A is formed in one of the short-side wall portions 2C of the fuel cell unit 2, as illustrated in FIG. 7 (fourth embodiment). Also, the fuel cartridge 1 and an opening and closing lid 6A may be formed integrally with each other, so that mounting of the fuel cartridge 1 and sealing of the opening 5 can be accomplished in a single operation, as illustrated in FIG. 8 (fifth embodiment). Further, the configuration of the second embodiment may be modified to a longitudinal structure in which one of the flat wall portions 12A is pivotably provided at one of the short-side wall portions 12C, by way of a pivot 16 as a pivot member, as illustrated in FIG. 9 (sixth embodiment). In the third embodiment, the holes 23, 23 . . . may be formed in only one of the flat faces 21A, as illustrated in FIG. 10 (seventh embodiment). In this case, concave portions 30A may be provided, instead of the valve bodies 26B, on the other flat face 12A. The positioning rods 25 are then omitted.

EXAMPLES

The present invention will be explained more specifically based on the examples and comparative examples below.

Example 1

Figure 3:
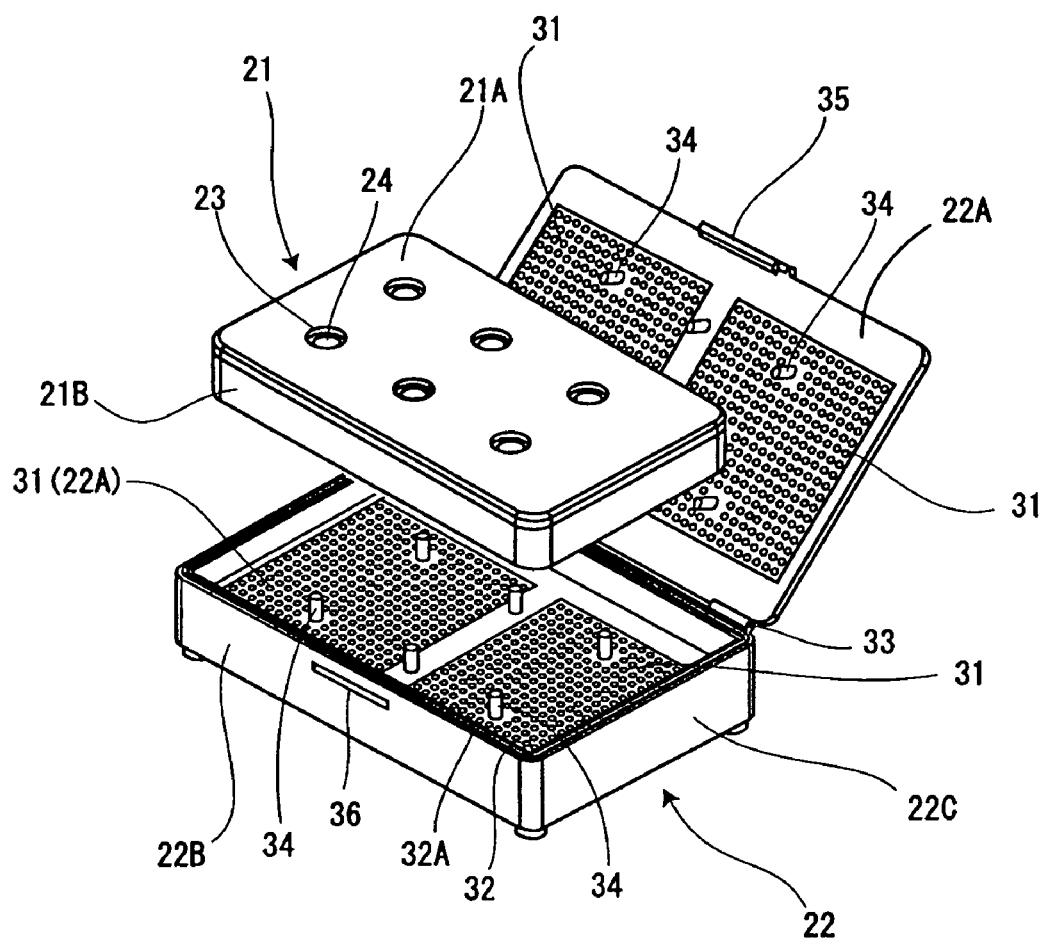
FIG. 3 is a perspective-view diagram illustrating a methanol fuel cell system according to a third embodiment of the present invention.
Figure 4:
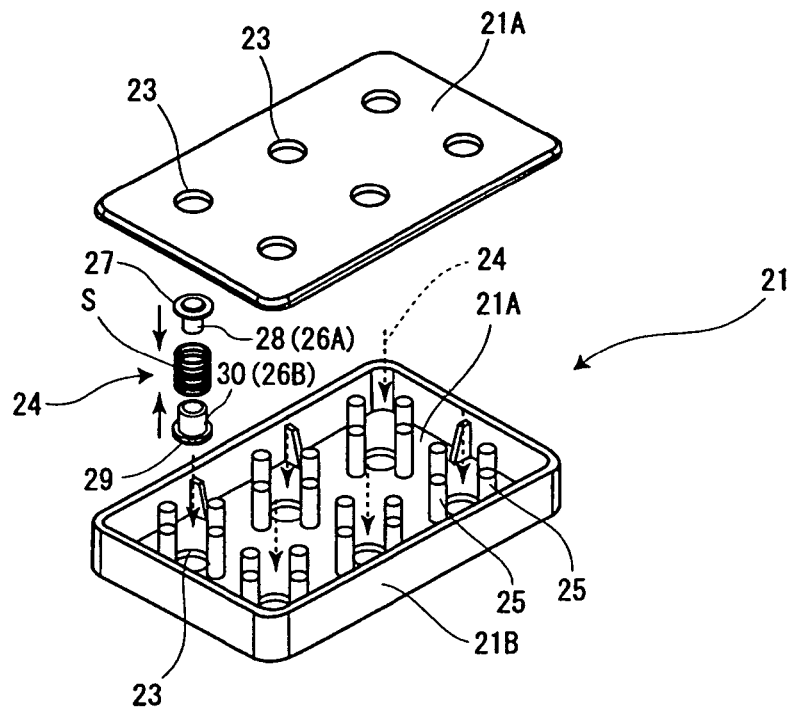
FIG. 4 is an exploded perspective-view diagram illustrating the methanol fuel cell system according to the above third embodiment.

<Fuel cartridge manufacture example 1>
A fuel cartridge 21 having the shape illustrated in FIG. 3 was molded using a modified PPE resin. The specifications of the fuel cartridge 21 were as follows.
Dimensions: 85.6×54×15 (mm)
Diameter of opening-closing valves 24: 6 mm φ
Number of holes 23: 6 holes each in both faces
Solid methanol packing amount: 30 cc
<Fuel cartridge manufacture example 2>
A fuel cartridge 21 having the shape illustrated in FIG. 3 was molded using a modified PPE resin. The specifications of the fuel cartridge 21 were as follows.
Dimensions: 85.6×54×15 (mm)
Size of the opening-closing valves 24: 32 mm×6 mm (rectangular)
Number of holes 23: 4 holes each in both faces
Solid methanol packing amount: 30 cc
<Air-Tightness Test>
The fuel cartridges obtained in manufacture examples 1 and 2 were stored for 1 hour in a chamber at 70° C. The weights before and after storage were measured to calculate the weight decrease speed and the content decrease ratio.
The results are given in Table 1.

TABLE 1

|  | Manufacture example 1 (circular valves) | Manufacture example 2 (rectangular valves) |
| --- | --- | --- |
| Container dry weight (g) | 35.86 | 43.49 |
| Weight before temperature load (g) | 41.79 | 47.00 |
| Weight after temperature load (g) | 41.76 | 46.86 |
| Weight decrease speed (g/hr) | 0.03 | 0.14 |
| Content decrease ratio (%) | 0.51 | 3.99 |

As Table 1 shows, the fuel cartridge of manufacture example 1, using circular valves, exhibited a slow fuel decrease speed no greater than 0.08 g/hr, which is an IEC standard.

Example 2

<Fuel cartridge manufacture examples 3 to 7>
Fuel cartridges 21 having the shape illustrated in FIG. 3 were molded using a modified PPE resin. The specifications of the fuel cartridges 21 were as follows.
Dimensions: 41×55×10 (mm)
Diameters of the opening-closing valves 24: 4, 6, 7, 8 and 10 mm φ
Number of holes 23: 4 in one face only
Solid methanol packing amount: 15 cc
<Release Characteristic Test>
The fuel cartridges of manufacture examples 3 to 7 were stored at room temperature (25° C.) for 2 hours with the opening-closing valves 24 open. The weights before and after storage were measured to calculate the weight decrease speed and the content decrease ratio.

The results are given in Table 2.

TABLE 2

|  | Manufacture example 3 (4 mm φ) | Manufacture example 4 (6 mm φ) | Manufacture example 5 (7 mm φ) | Manufacture example 6 (8 mm φ) | Manufacture example 7 (10 mm φ) |
| --- | --- | --- | --- | --- | --- |
| Container dry weight (g) | 27.54 | 27.99 | 27.74 | 27.42 | 25.85 |
| Initial weight (g) | 34.14 | 35.20 | 35.50 | 33.67 | 32.75 |
| Weight after 2 hours (g) | 33.79 | 34.64 | 34.76 | 32.93 | 31.75 |
| Weight decrease speed (g/hr) | 0.18 | 0.28 | 0.37 | 0.37 | 0.50 |
| Content decrease ratio (%) | 5.30 | 7.77 | 9.54 | 11.84 | 14.49 |

As Table 2 shows, the hole diameter size, the number of holes and the fuel release characteristics exhibit substantially proportional relationships. Therefore, although holes having a diameter as large as possible are desirable in terms of fuel release, it is found that a size no greater than 8 mm φ is appropriate, from the viewpoint of safety upon accidental finger touch.

Example 3

<Fuel cartridge manufacture example 8>

A fuel cartridge 21 having the shape illustrated in FIG. 3 was molded using a modified PPE resin. The specifications of the fuel cartridge 21 were as follows.

Dimensions: 85.6×54×15 (mm)
Diameter of opening-closing valves 24: 6 mm φ
Number of holes 23: 6 in one face only
Solid methanol packing amount: 30 cc <Release Characteristic Test>

The fuel cartridges of manufacture examples 1 and 8 were stored at room temperature (25° C.) for 2 hours with the opening-closing valves 24 open. The weights before and after storage were measured to calculate the weight decrease speed and the content decrease ratio.

The results are given in Table 3.

TABLE 3

|  | Manufacture example 1 (both faces) | Manufacture example 8 (one face) |
| --- | --- | --- |
| Container dry weight (g) | 32.48 | 30.38 |
| Initial weight (g) | 41.94 | 40.68 |
| After 2 hours (g) | 40.72 | 39.95 |
| Weight decrease speed (g/hr) | 0.61 | 0.37 |
| Content decrease ratio (%) | 12.90 | 7.09 |

As Table 3 shows, there is an approximately 1.8-fold difference in the fuel release characteristics between a fuel cartridge having holes 23 formed in both faces (manufacture example 1) and a fuel cartridge having holes 23 formed in only one face (manufacture example 8). This demonstrates that it is possible to adjust the release rate.

Example 4

<Fuel cartridge manufacture example 9>

A fuel cartridge 21 having the shape illustrated in FIG. 3 was molded using a modified PPE resin. The specifications of the fuel cartridge 21 were as follows.

Dimensions: 85.6×54×15 (mm)
Diameter of opening-closing valves 24: 6 mm φ
Number of holes 23: 8 holes in each face
Solid methanol packing amount: 30 cc <Release Characteristic Test>

The fuel cartridges of manufacture examples 1 and 9 were stored at room temperature (25° C.) for 2 hours with the opening-closing valves 24 open. The weights before and after storage were measured to calculate the weight decrease speed and the content decrease ratio.

The results are given in Table 4.

TABLE 4

|  | Manufacture example 1 (6 holes) | Manufacture example 9 (8 holes) |
| --- | --- | --- |
| Container dry weight (g) | 32.48 | 34.72 |
| Initial weight (g) | 41.94 | 42.71 |
| After 2 hours (g) | 40.72 | 41.26 |
| Weight decrease speed (g/hr) | 0.61 | 0.73 |
| Content decrease ratio (%) | 12.90 | 18.15 |

As Table 4 shows, the number of holes and the fuel release characteristics exhibit substantially proportional relationships, such that fuel release improves as the number of holes increases. For cartridges of identical outer diameter, however, a greater dry weight of the container translates into a smaller solid methanol content and a lower energy density. This is found to be unsuitable for applications that involve long-term use.

The invention claimed is:

1. A direct methanol fuel cell system, comprising:
   a fuel cartridge having an elongated-box shape with flat surfaces and an interior storing solid methanol;
   a fuel cell unit having two configurations including an open configuration having a hollow interior and a closed configuration containing the fuel cartridge therein, the fuel cell unit having an elongated-box shape with flat wall portions adjacent the flat surfaces of the fuel cartridge when the fuel cell unit is in the closed position, and
   fuel cells being respectively disposed at the flat wall portions of the fuel cell unit and opposite to the flat surfaces of the fuel cartridge when the fuel cell unit is in the closed configuration,
   wherein the fuel cartridge includes apertures on the flat faces thereof, the apertures are configured to close when the fuel cartridge is outside the fuel cell unit, and the apertures are configured to open and permit passage of methanol from the fuel cartridge to the fuel cell when the fuel cell unit is in the closed configuration containing the fuel cartridge therein.

2. The direct methanol fuel cell system according to claim 1, wherein the fuel cells are disposed with fuel electrodes facing inwardly, and the fuel electrodes are integrally formed with the flat wall portions of the fuel cell unit.

3. The direct methanol fuel cell system according to claim 2, wherein the flat wall portions of the fuel cell unit each contain more than one of the fuel cells.

4. The direct methanol fuel cell system according to claim 2, wherein the flat fuel cell unit has an opening on a side face of the fuel cell unit and the fuel cartridge is inserted and removed through the opening when switching the fuel cell unit between the open and closed configurations.

5. The direct methanol fuel cell system according to claim 2, wherein a side wall portion of the fuel cell unit pivots to open and close the fuel cell, and the fuel cartridge is inserted and removed through the side wall portion when switching the fuel cell unit between the open and closed configurations.

6. The direct methanol fuel cell system according to claim 2, wherein the fuel cartridge comprises: a cartridge main body, opening-closing valves disposed at the apertures, and opening-closing members formed on the flat wall portion of the fuel cell unit at positions that correspond to the apertures, and the cartridge main body comprises a pair of flat plate sections and a peripheral side section, and the apertures face at least one of the flat plate sections.

7. A fuel cartridge for the direct methanol fuel cell system according to claim 1, wherein the fuel cartridge comprises: a cartridge main body, opening-closing valves disposed at the apertures, and an opening and closing member is formed on the flat wall portions of the fuel cell unit at positions that correspond to the apertures, and the cartridge main body comprises a pair of flat plate sections and a peripheral side section, and the apertures face at least one of the flat plate sections.

8. A portable electronic device comprising the direct methanol fuel cell system according to claim 1.

9. A direct methanol fuel cell system, comprising:
a fuel cell unit having an elongated box-shape with a hollow interior configured to receive a fuel cartridge therein, the elongated box-shape of the fuel cell unit including a flat wall portion,
a fuel cell arranged at the flat wall portion of the fuel cell unit,
the fuel cartridge having an elongated box-shape with a hollow interior storing solid methanol therein, the elongated box-shape of the fuel cartridge including a flat wall portion facing the flat wall portion of the fuel cell unit when the fuel cell cartridge is received in the fuel cell unit,
a valve means for opening and closing apertures passing methanol from the fuel cartridge to the fuel cell, the valve means closing the apertures when the fuel cartridge is outside the fuel cell unit and the valve means opening the apertures when the fuel cartridge is contained within the fuel cell unit.

10. The direct methanol fuel cell system according to claim 9, wherein the fuel cell has a fuel electrode facing inward and the fuel electrode is integrally formed with the flat wall portions of the fuel cell unit.

11. The direct methanol fuel cell system according to claim 10, further comprising more than one fuel cell and more than one flat wall portion of the fuel cell unit, and each fuel cell is arranged adjacent a respective flat wall portion of the fuel cell unit.

12. The direct methanol fuel cell system according to claim 10, wherein the fuel cell unit has an opening on a side face that is configured open when inserting and removing the fuel cartridge into and from the fuel cell unit and configured closed when holding the fuel cartridge in the fuel cell unit.

13. The direct methanol fuel cell system according to claim 10, wherein the at least one flat wall portion of the fuel cell unit is pivotally mounted on a side wall portion of the fuel cell unit, the at least one flat wall portion pivots to open and close the fuel cell unit, the fuel cartridge is inserted into and removed from the fuel cell unit when the at least one flat wall portion is pivoted to open the fuel cell unit, and the fuel cartridge is sealed inside the fuel cell unit when the at least one flat wall portion is pivoted to close the fuel cell unit.

14. The direct methanol fuel cell system according to claim 10, wherein the fuel cartridge further comprises a cartridge main body having a pair of flat plate sections and a peripheral side section, and the valves means are contained in the fuel cell unit and face at least one of the flat plate sections.

15. The direct methanol fuel cell system according to claim 9, wherein the flat wall portion of the fuel cartridge contains the apertures and the fuel cell unit contains the valve means.

16. The direct methanol fuel cell system according to claim 9, wherein the apertures are provided in the flat wall portion of the fuel cartridge, the valve means includes valve bodies covering the apertures, and the fuel cell unit includes opening rods that move the valve bodies away from the apertures when the fuel cartridge is contained within the fuel cell.

17. The direct methanol fuel cell system according to claim 9, wherein the apertures are provided in the flat wall portion of the fuel cartridge, the valve means includes valve bodies and biasing means for biasing the valve bodies to cover and close the apertures, and the fuel cell unit includes opening rods that push the valve bodies away from the apertures when the fuel cartridge is contained within the fuel cell.

18. The direct methanol fuel cell system according to claim 10, wherein the apertures are provided in the flat wall portion of the fuel cartridge, the valve means includes valve bodies covering the apertures, and the fuel cell unit includes opening rods that move the valve bodies away from the apertures when the fuel cartridge is contained within the fuel cell.

19. The direct methanol fuel cell system according to claim 10, wherein the apertures are provided in the flat wall portion of the fuel cartridge, the valve means includes valve bodies and biasing means for biasing the valve bodies to cover and close the apertures, and the fuel cell unit includes opening rods that push the valve bodies away from the apertures when the fuel cartridge is contained within the fuel cell.

20. A portable electronic device comprising the direct methanol fuel cell system according to claim 9.

* * * * *